(12) United States Patent
Krishnan et al.

(10) Patent No.: US 10,875,338 B2
(45) Date of Patent: Dec. 29, 2020

(54) ADDITIVES TO LITHO INKS TO ELIMINATE INK FEEDBACK

(71) Applicant: SUN CHEMICAL CORPORATION, Parsippany, NJ (US)

(72) Inventors: Ramasamy Krishnan, North Brunswick, NJ (US); Jeff Jones, Chicago, IL (US); Matthias Helliblau, Seligenstadt (DE)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 0 days.

(21) Appl. No.: 14/345,747

(22) PCT Filed: Sep. 20, 2012

(86) PCT No.: PCT/US2012/056415
§ 371 (c)(1),
(2) Date: Mar. 19, 2014

(87) PCT Pub. No.: WO2013/043921
PCT Pub. Date: Mar. 28, 2013

(65) Prior Publication Data
US 2014/0216286 A1    Aug. 7, 2014

Related U.S. Application Data

(60) Provisional application No. 61/538,718, filed on Sep. 23, 2011.

(51) Int. Cl.
*B41M 1/06* (2006.01)
*C09D 11/08* (2006.01)
(Continued)

(52) U.S. Cl.
CPC ............... *B41M 1/06* (2013.01); *C09D 11/03* (2013.01); *C09D 11/06* (2013.01); *C09D 11/08* (2013.01); *C09D 11/101* (2013.01)

(58) Field of Classification Search
CPC ......... C09D 11/03; C09D 11/06; C09D 11/08; C09D 11/101; B41M 1/06
See application file for complete search history.

(56) References Cited

U.S. PATENT DOCUMENTS

| 4,238,380 A | 12/1980 | Alford |
| 5,560,766 A | 10/1996 | Gundlach |

(Continued)

FOREIGN PATENT DOCUMENTS

| CN | 1372584 | 10/2002 |
| CN | 1685023 | 10/2005 |

(Continued)

OTHER PUBLICATIONS

International Search Report issued in connection with International Application No. PCT/US2012/056415 dated Apr. 29, 2013.

(Continued)

*Primary Examiner* — Michael M. Robinson
(74) *Attorney, Agent, or Firm* — Charles C. Achkar; Ostrolenk Faber LLP.

(57) ABSTRACT

Provided are web-offset lithographic ink compositions that contain an alkyl thioether surfactant, an alkoxylated modified rosin, or a combination thereof. The ink compositions can be oil-based inks or water-based inks that can be radiation-curable. The resulting ink compositions can be used in web-offset lithographic printing to substantially reduce or eliminate the ink feedback and ink build-up that occurs during printing. Also provided are methods for reducing or eliminating ink feedback and build-up during lithographic printing processes.

5 Claims, 5 Drawing Sheets

(51) Int. Cl.
*C09D 11/101* (2014.01)
*C09D 11/06* (2006.01)
*C09D 11/03* (2014.01)

(56) References Cited

U.S. PATENT DOCUMENTS

| | | | |
|---|---|---|---|
| 6,174,357 B1 | 1/2001 | Kappele | |
| 2002/0083865 A1* | 7/2002 | Krishnan | C09D 11/02 106/31.6 |
| 2002/0128340 A1* | 9/2002 | Young | B41M 3/006 522/1 |
| 2004/0115561 A1* | 6/2004 | Laksin | C09D 11/101 430/285.1 |
| 2005/0013938 A1 | 1/2005 | Arndt | |
| 2005/0250875 A1 | 11/2005 | Marr et al. | |
| 2008/0161535 A1* | 7/2008 | Wiggins | C09D 5/024 530/210 |
| 2009/0176936 A1* | 7/2009 | Kim et al. | 525/50 |
| 2010/0242757 A1* | 9/2010 | Laksin | C09D 11/101 101/170 |

FOREIGN PATENT DOCUMENTS

| | | |
|---|---|---|
| EP | 1386729 A1 | 2/2004 |
| JP | S61-138677 | 6/1986 |
| JP | S63-025093 | 2/1988 |
| JP | H03-296575 | 12/1991 |
| JP | 2003-170673 | 6/2003 |
| JP | 2003-175685 | 6/2003 |
| JP | 2006-117664 | 5/2006 |
| WO | 2011089238 A1 | 7/2011 |

OTHER PUBLICATIONS

Chinese Office Action for Application No. 201280050643.6 dated Jan. 4, 2015, with English translation.
Chinese Office Action issued in Chinese Application No. 201280050643. 6, dated Oct. 21, 2015 (with English Language Translation).
"Hydrogenated Castor Oil—Process, Applications, Product, Patent, Consultants, Company Profiles, Plant, Projects, Raw Materials." Primary Information Services. Available online at: www.primaryinfo.com/projects/hydrogenated-castor-oil.htm Viewed on Dec. 30, 2015.
Levinson, H. J. "Principles of Lithography, Second Edition" 2005. SPIE Press, Bellingham, WA. Available online at: http://spie.org/x33281.xml.
Japanese Office Action issued in Japanese Application No. 2014-531977, dated Apr. 12, 2016 (with English Language Translation).
EP Office Action issued in counterpart EP application No. 12770376.7 dated May 9, 2017.
US EPA, Safer Chemical Ingredients List, retrieved from https://www.epa.gov/saferchoice/safer-ingredients, Nov. 13, 2017.
Office Action issued in Canadian Counterpart Application No. 2,849,767, dated Aug. 1, 2018.

* cited by examiner

ADDITIVES TO LITHO INKS TO ELIMINATE INK FEEDBACK

RELATED APPLICATION

This application is a § 371 National Phase application based on PCT/US2012/056415 filed on Sep. 20, 2012, and claims the benefit of priority to U.S. Provisional Application Ser. No. 61/538,718, to Ramasamy Krishnan, Jeff Jones and Matthias Hellblau, filed on Sep. 23, 2011, and entitled "ADDITIVES TO LITHO INKS TO ELIMINATE INK FEEDBACK." Where permitted, the subject matter of this application is incorporated by reference in its entirety.

BACKGROUND

Lithography is a planographic printing process that utilizes printing plates having the image and non-image areas in the same plane. An offset lithographic printing press typically includes a plate cylinder carrying one or more printing plates. An inker applies ink to the printing plate utilizing one or more form rollers. The ink film on the form roller contacts the image areas on the printing plate, transferring the ink from the form roller to the printing plate. The inked image on the plate is then transferred to a blanket cylinder which transfers the image to the material to be printed, such as paper. The process is referred to as offset lithography because the printing plate does not print directly onto paper, but is first "offset" onto a rubber blanket (offset blanket) before forming a reproduction of the image on the material.

Chemical treatments are used to create areas of different surface energy on the printing plate such that the ink adheres to some areas and not others. The printing (image) areas are typically hydrophobic and ink receptive, while the non-printing areas are typically hydrophilic and water receptive. To achieve this effect, the plate can be damped with a water-based fountain solution (dampening solution) before it is inked. The fountain solution can be stored in a container and delivered to the printing plate by one or more chrome (dampening) rollers. The fountain solution typically forms a film on the water receptive areas of the plate, but forms tiny droplets on the water repellent areas. When a form roller is passed over the damped plate, it is unable to ink the non-printing areas covered by the film, but is able to push aside the droplets on the water repellent areas, coating those areas with ink.

During the printing process, the plate must be continuously treated with the fountain solution in order to maintain the thin film, thus maintaining the hydrophilic character of the non-image areas. The thin film of fountain solution prevents subsequent applications of ink from covering non-image areas of the plate. However, there is a tendency for ink to build up on the dampening roller and adhere to non-image areas of the printing plate surface when printing is carried out with repeated interruptions. This is referred to as "scumming" or "ink feedback" and results in the undesirable formation of spots and rings on the printed material.

Ink feedback (i.e., tinting) and excessive ink build-up (i.e., scumming) on the dampening rollers are common problems of high-speed web-offset lithographic printing. In many instances, printing presses experience several color changes in a single day, which can increase the amount of tinting and scumming. In such instances, the chrome rollers and printing plate must be cleansed thoroughly so that they will maintain the ability to be receptive to water and to reject ink. The passive (hydrophilic) chrome rollers are provided to improve "damping" control by minimizing tinting and scumming, but are not perfect in this regard. Good printing will result only if tinting and scumming are prevented.

Tinting and scumming have become more of a challenge since the switch to alcohol-free fountain solutions in conjunction with continuous-roll dampening systems that directly apply fountain solution to the plate without any connection to the ink rolls. The dampening roller can pick up ink from the plate and transfer the ink back to the metering roll via porous and ink-sensitive chrome rolls within the metering system. With no path back to the inker, the emulsified ink continues to build-up. While methods exist for preventing the accumulation of ink on the rollers, many of those methods are expensive, inconvenient and can increase printing time. To that end, a solution is desired that will prevent or at least alleviate tinting and scumming problems.

Because fountain solutions are water-based, there are many commercially available fountain solutions containing water-soluble additives, such as surfactants and rosins. However, the presence of additives in the fountain solution can be detrimental to the printing process. Since the fountain solution is continuously applied during the printing process, the actual amount of additive cannot be controlled, which can lead to defects in the printed materials. Alternatively, the additive can be incorporated into the ink composition rather than the fountain solution. Typically, inks used in the printing industry are oil-based inks, and the additives that are incorporated into the inks are oil-soluble additives (see, e.g., U.S. Pat. No. 5,417,749, where the additive is a surfactant such as lecithin or an alkylpolyglucoside). Even though the amount of additive can be controlled when added to the ink composition, printing problems still can arise. However, oil-based inks containing water-soluble additives such as alkyl thioether surfactants or highly alkoxylated rosins have not been disclosed in the prior art.

U.S. Pat. No. 5,203,926 discloses a formulation used to keep the rollers and printing plates clean and fresh so as to prevent ink from sticking to the rollers and printing plates. This is accomplished by using a cleansing solution compatible with fountain solutions used in the printing industry. However, this method requires the printing process to be stopped so that the printing plates and rollers can be wiped with a clean cloth before printing is resumed.

In an attempt to eliminate ink feedback and build-up, fountain solutions incorporating water-soluble additives, such as surfactants, have been developed. The additives provide important wetting and emulsification properties and are also used to replace alcohols in the fountain solution, which are flammable, toxic and irritating. U.S. Pat. Nos. 7,240,615; 5,607,816; and 4,854,969; and U.S. Patent Publication No. 2002/0083865 disclose fountain solutions that incorporate surfactants. The surfactants not only facilitate the dispersion of the hydrophobic imaging compositions in the fountain solution, but also reduce ink feedback and build-up.

Dampening systems with novel parts designed for reducing the amount of ink feedback have been developed to address the problem of ink feedback and build-up. U.S. Pat. No. 4,724,764 discloses a dampening system used for applying fluid to the plate cylinder of printing presses. This system includes a dampening form roller, a dampening fluid transfer roller, and a conventional metering mechanism for metering the dampening fluid. The system reduces the amount of ink feedback by ensuring that the speed of the roller carrying the dampening fluid is lower than the speed of the plate cylinder. U.S. Pat. No. 6,951,174 also describes a dampening system that reduces the amount of ink feedback and build-up. The system is a keyless inking system that employs a subtractive roller system that contacts the form rollers and removes excess ink and fountain solution from the form roller after printing. Utilizing these systems requires obtaining novel parts and equipment, which must then be interconnected to the lithographic press.

A need therefore exists for a non-mechanical means for reducing the problems associated with web-offset lithographic printing, such as reducing or eliminating ink feedback and excessive ink build-up that occur on non-printing plates during the lithographic printing process. Another need exists for an ink composition that eliminates ink feedback and build-up during the offset lithographic printing process, thus resulting in good and efficient printing.

SUMMARY

Provided herein are web-offset lithographic ink compositions that contain a colorant, a varnish and a water-soluble alkyl thioether surfactant or alkoxylated modified rosin, such as an ethoxylated modified rosin, or a combination thereof. The ink compositions provided herein can be oil-based ink compositions or water-based ink compositions which can be radiation-curable ink compositions. The offset lithographic ink compositions provided herein can also include one or more additional ingredients, such as a vehicle, a clay, an emulsion stabilizer, a wax, an oil and an emulsifier, or any combination thereof.

Also provided herein are methods to reduce or eliminate ink feedback and ink build-up that occurs during a web-offset lithographic printing process by providing a lithographic ink, adding a water-soluble alkyl thioether surfactant or alkoxylated modified rosin, such as an ethoxylated modified rosin, or a combination thereof, to the lithographic ink, and applying the ink to a substrate using a lithographic printing process.

Further provided are uses of a water soluble alkyl thioether surfactant or an alkoxylated modified rosin, such as an ethoxylated modified rosin, or a combination thereof, as an additive in a lithographic ink to reduce ink feedback and ink build-up during lithographic printing.

BRIEF DESCRIPTION OF THE FIGURES

FIG. 1.

FIG. 2.

FIG. 3: FIG. 3 illustrates the results of press trial runs on a Didde press using Dingley yellow laser ink with or without a water-soluble highly ethoxylated rosin additive. FIG. 3 A shows the results of a trial that used Ink 9, a comparative ink that did not contain either an alkyl thioether surfactant or an alkoxylated modified rosin. There was significant accumulation of ink on the bottom ink roller, resulting in many scattered bands of yellow ink.

DETAILED DESCRIPTION OF THE INVENTION

A. Definitions

The definitions of the technical and scientific terms provided herein encompass definitions intended at the time of filing this application. These definitions are not meant to be restrictive, as there can be other aspects to the definitions that are not recited, such as those commonly understood by one of skill in the art to which the invention(s) belong. All patents, patent applications, published applications and publications, websites and other published materials referred to throughout the entire disclosure herein, unless noted otherwise, are incorporated by reference in their entirety. In the event that there are pluralities of definitions for terms herein, those in this section prevail.

It is to be understood that both the foregoing general description and the following detailed description are exemplary and explanatory only and are not restrictive of the subject matter claimed. In this application, the use of the singular includes the plural unless specifically stated otherwise. In this application, the use of "or" means "and/or" unless stated otherwise. Furthermore, use of the term "including" as well as other forms, such as "includes," and "included" is not limiting.

As used herein, ranges and amounts can be expressed as "about" a particular value or range. "About" also includes the exact amount. Hence "about 10%" means "about 10%" and also "10%."

As used herein, the singular forms "a," "an" and "the" include plural referents unless the context clearly dictates otherwise. Thus, for example, reference to a composition comprising "an alkyl thioether" includes compositions with one or a plurality of alkyl thioethers.

As used herein, "tinting" and "ink feedback" or "feedback" refer to the weak appearance of color on a non-image area of the printed material. Tinting occurs when pigment, with or without other ink ingredients, becomes solubilized or emulsified into the fountain solution and is transferred to the non-image area of the printed material. Tinting can also occur from the formation of an inverse emulsion, i.e., when the emulsion being formed is ink-in-water rather than the necessary water-in-ink. The formation of an inverse emulsion will cause the ink to transfer back through the dampening system where it will either contaminate the fountain trough or pile on the dampening rollers.

As used herein, "scumming" and "ink build-up" or "build-up" refer to the appearance of color on the printed material that occurs when non-image areas of the plate accept and transfer ink to the blanket and from there to the printed material.

B. Web-Offset Lithographic Ink Compositions

Provided herein are web-offset lithographic ink compositions that include a water-soluble alkyl thioether surfactant, an alkoxylated modified rosin, or a combination thereof. For example, the alkoxylated modified rosin can be a highly alkoxylated modified rosin. Suitable highly alkoxylated modified rosins include highly ethoxylated modified rosins. The web-offset lithographic ink compositions reduce, if not eliminate, ink feedback and excessive ink build-up that occurs during the web-offset lithographic printing process. Due to this feature, the ink compositions are advantageous over existing prior art web-offset lithographic ink compositions. The web-offset lithographic ink compositions provided herein can be any type of lithographic ink. For example, the web-offset lithographic inks can be oil-based inks or water-based inks. The inks can be radiation-curable inks, such as electron-beam cured inks or ultra-violate cured inks. The ink compositions can be used in any web-offset lithographic printing process where elimination of ink feedback is desired. For example, the ink compositions provided herein can be used in lithographic, or offset, printing, such as high speed web-offset lithographic printing.

In an exemplary embodiment, the web-offset lithographic ink compositions can be formulated to contain from about 0.01 to 5% of a water-soluble alkyl thioether surfactant or from about 1 to 10% of an alkoxylated modified rosin. In another embodiment the web-offset lithographic ink composition can be formulated to contain both a water-soluble alkyl thioether surfactant and an alkoxylated modified rosin. In some exemplary embodiments, the web-offset lithographic ink compositions are oil-based ink compositions. In other exemplary embodiments, the web-offset lithographic ink compositions are radiation-curable ink compositions, such as electron-beam curable ink compositions.

1. Water-Soluble Alkyl Thioether Surfactant

The web-offset lithographic ink compositions provided herein can include a water-soluble alkyl thioether surfactant. Water-soluble alkyl thioether surfactants are typically used in fountain solutions to improve ozone resistance and to inhibit changes in hue and to provide equilibrium surface tension reduction. These surfactants, however, have not been used as additives in web-offset lithographic inks, for example in oil-based web-offset lithographic inks. Suitable water-soluble alkyl thioether surfactants that can be incorporated in the ink compositions provided herein include any ether derivative where the oxygen is replaced by sulfur. Such surfactants are known in the art and can be purchased from suppliers such as Air Products (Allentown, Pa.) and Burlington Chemical (Greensboro, N.C.).

Examples of suitable alkyl thioethers for use in the ink compositions provided herein include 2,3-dihydroxypropyl-2'-hydroxy-3'-(2-ethylhexyloxy)propyl sulfide; 2,3-dihydroxypropyl-2'-hydroxy-3'-dodecyloxypropyl sulfide; 2,3-dihydroxypropyl-2'-hydroxy-3 '-hexadecyloxypropyl sulfide; 2,3-dihydroxypropyl-2'-hydroxy-3'-tetradecyloxypropyl sulfide; 2-hydroxyethyl-2'-hydroxy-3'-butoxypropyl sulfide; 2-hydroxyethyl-2'-hydroxy-3 '-octyloxypropyl sulfide; 2-hydroxyethyl-2'-hydroxy-3 '-nonyloxypropyl sulfide; 2-hydroxyethyl-2'-hydroxy-3'-decyloxypropyl sulfide; 2-hydroxyethyl-2'-hydroxy-3 '-dodecyloxypropyl sulfide; 2-hydroxyethyl-2'-hydroxy-3 '-hexadecyloxypropyl sulfide; 2-hydroxyethyl-2'-hydroxy-3 '-tetradecyloxypropyl sulfide; 2-hydroxyethyl-2'-hydroxy-3'-(2-ethylhexyloxy) propyl sulfide; and 2-dodecyl-2'-hydroxy-3'-butoxypropyl sulfide. Any other suitable water-soluble alkyl thioether known to those of skill in the art also can be used in the ink compositions provided herein.

A particular example of an alkyl thioether surfactant used in exemplary embodiments of the invention is commercially available as EnviroGem® 360 from Air Products and Chemicals (Allentown, Pa.). EnviroGem® 360 is a high-performance nonionic superwetting and coalescing surfactant (100% active liquid). EnviroGem® 360 surfactant greatly reduces dynamic and equilibrium surface tension and also provides low foam and film formation/coalescing benefits. EnviroGem® 360 can be used in a variety of water-borne applications, for example, as a component of fountain solutions to provide efficient and effective wetting of printing plates and foam control.

In the web-offset lithographic ink compositions provided herein, the total amount of alkyl thioether surfactant as a percentage (%) by weight of the ink composition (wt %>) can be, e.g., from at or about 0.01% to at or about 5%>, such as 0.01% to 0.05%, 0.01% to 0.1%, 0.01% to 0.2%, 0.01% to 0.3%, 0.01% to 0.4%, 0.01% to 0.5%, 0.01% to 0.6%, 0.01% to 0.7%, 0.01% to 0.8%, 0.01% to 0.9%, 0.01% to 1%, 0.01% to 1.5%, 0.01% to 2%, 0.01% to 2.5%, 0.01% to 3%, 0.01% to 3.5%, 0.01% to 4%, 0.01% to 4.5%, 0.01% to 5%, 0.05% to 0.1%, 0.05% to 0.2%, 0.05% to 0.3%, 0.05% to 0.4%, 0.05% to 0.5%, 0.05% to 0.6%, 0.05% to 0.7%, 0.05% to 0.8%, 0.05% to 0.9%, 0.05% to 1%, 0.05% to 1.5%, 0.05% to 2%, 0.05% to 2.5%, 0.05% to 3%, 0.05% to 3.5%, 0.05% to 4%, 0.05% to 4.5%, 0.05% to 5%, 0.1% to 0.2%, 0.1% to 0.3%, 0.1% to 0.4%, 0.1% to 0.5%, 0.1% to 0.6%, 0.1% to 0.7%, 0.1% to 0.8%, 0.1% to 0.9%, 0.1% to 1%, 0.1% to 1.5%, 0.1% to 2%, 0.1% to 2.5%, 0.1% to 3%, 0.1% to 3.5%, 0.1% to 4%, 0.1% to 4.5%, 0.1% to 5%, 0.2% to 0.3%, 0.2% to 0.4%, 0.2% to 0.5%, 0.2% to 0.6%, 0.2% to 0.7%, 0.2% to 0.8%, 0.2% to 0.9%, 0.2% to 1%, 0.2% to 1.5%, 0.2% to 2%, 0.2% to 2.5%, 0.2% to 3%, 0.2% to 3.5%, 0.2% to 4%, 0.2% to 4.5%, 0.2% to 5%, 0.3% to 0.4%, 0.3% to 0.5%, 0.3% to 0.6%, 0.3% to 0.7%, 0.3% to 0.8%, 0.3% to 0.9%, 0.3% to 1%, 0.3% to 1.5%, 0.3% to 2%, 0.3% to 2.5%, 0.3% to 3%, 0.3% to 3.5%, 0.3% to 4%, 0.3% to 4.5%, 0.3% to 5%, 0.4% to 0.5%, 0.4% to 0.6%, 0.4% to 0.7%, 0.4% to 0.8%, 0.4% to 0.9%, 0.4% to 1%, 0.4% to 1.5%, 0.4% to 2%, 0.4% to 2.5%, 0.4% to 3%, 0.4% to 3.5%, 0.4% to 4%, 0.4% to 4.5%, 0.4% to 5%, 0.5% to 0.6%, 0.5% to 0.7%, 0.5% to 0.8%, 0.5% to 0.9%, 0.5% to 1%, 0.5% to 1.5%, 0.5% to 2%, 0.5% to 2.5%, 0.5% to 3%, 0.5% to 3.5%, 0.5% to 4%, 0.5% to 4.5%, 0.5% to 5%, 0.6% to 0.7%, 0.6% to 0.8%, 0.6% to 0.9%, 0.6% to 1%, 0.6% to 1.5%, 0.6% to 2%, 0.6% to 2.5%, 0.6% to 3%, 0.6% to 3.5%, 0.6% to 4%, 0.6% to 4.5%, 0.6% to 5%, 0.7% to 0.8%, 0.7% to 0.9%, 0.7% to 1%, 0.7% to 1.5%, 0.7% to 2%, 0.7% to 2.5%, 0.7% to 3%, 0.7% to 3.5%, 0.7% to 4%, 0.7% to 4.5%, 0.7% to 5%, 0.8% to 0.9%, 0.8% to 1%, 0.8% to 1.5%, 0.8% to 2%, 0.8% to 2.5%, 0.8% to 3%, 0.8% to 3.5%, 0.8% to 4%, 0.8% to 4.5%, 0.8% to 5%, 0.9% to 1%, 0.9% to 1.5%, 0.9% to 2%, 0.9% to 2.5%, 0.9% to 3%, 0.9% to 3.5%, 0.9% to 4%, 0.9% to 4.5%, 0.9% to 5%, 1% to 1.5%, 1% to 2%, 1% to 2.5%, 1% to 3%, 1% to 3.5%, 1% to 4%, 1% to 4.5%, 1% to 5%, 1.5% to 2%, 1.5% to 2.5%, 1.5% to 3%, 1.5% to 3.5%, 1.5% to 4%, 1.5% to 4.5%, 1.5% to 5%, 2% to 2.5%, 2% to 3%, 2% to 3.5%, 2% to 4%, 2% to 4.5%, 2% to 5%, 2.5% to 3%, 2.5% to 3.5%, 2.5% to 4%, 2.5% to 4.5%, 2.5% to 5%, 3% to 3.5%, 3% to 4%, 3% to 4.5%, 3% to 5%, 3.5% to 4%, 3.5% to 4.5%, 3.5% to 5%, 4% to 4.5%, 4% to 5%, or 4.5% to 5% by weight of the ink composition. Generally, the ink compositions contain less than 5% alkyl thioether surfactant. For example, the web-offset lithographic ink compositions provided herein contain up to at or about 0.01%, 0.1%>, 0.2%>, 0.3%>, 0.4%, 0.5%, 0.6%, 0.7%, 0.8%, 0.9%, 1%, 1.5%, 2%, 2.5%, 3%, 3.5%, 4%, 4.5% or 5% alkyl thioether surfactant, based on the weight of the composition.

Provided herein are exemplary web-offset lithographic ink compositions that contain a water-soluble alkyl thioether surfactant. The web-offset lithographic ink compositions provided herein can be used to reduce or eliminate ink feedback and build-up that commonly occurs during the lithographic printing process. Exemplary of such ink compositions contain an oil-based ink and from at or about 0.01% to at or about 5% of a water-soluble alkyl thioether surfactant. For example, the ink compositions can contain an oil-based ink and at or about 0.3% of a water-soluble alkyl thioether surfactant.

2. Alkoxylated Modified Rosin

Provided herein are web-offset lithographic ink compositions that contain an alkoxylated modified rosin. Rosin is a solid form of resin obtained from pines and some other plants, mostly conifers, produced by heating fresh liquid resin to vaporize the volatile liquid terpene components. Rosin is mainly a mixture of $C_{2o}$, tricyclic fused-ring, monocarboxylic acids, typified by the free acid form (i.e., abietic acid), represented by the following formula:

Rosins can be modified, such as by the addition of functional groups. For example, a rosin can be modified by adding one or more alkoxy groups. A rosin can be modified so that it is a highly alkoxylated modified rosin. A highly alkoxylated modified rosin is a rosin that is more than or about 10% alkoxylated, but less than or about 70% alkoxylated. For example, the highly alkoxylated modified rosins used in the ink compositions provided herein can between from or between about from 10% alkoxylated to 70% alkoxylated, such as 10% to 20%, 10% to 30%, 10% to 40%, 10% to 45%, 10% to 50%, 10% to 55%, 10% to 60%, 10% to 70%, 20% to 30%, 20% to 40%, 20% to 45%, 20% to 50%, 20% to 55%, 20% to 60%, 20% to 70%, 30% to 40%, 30% to 45%, 30% to 50%, 30% to 55%, 30% to 60%, 30% to 70%, 40% to 45%, 40% to 50%, 40% to 55%, 40% to 60%, 40% to 70%, 50% to 55%, 50% to 60%, 50% to 70%, 55% to 60%, 55% to 70%, and 60% to 70% alkoxylated. Generally, the alkoxylated modified rosin is less than 70% alkoxylated. For example, the alkoxylated modified rosins used in the ink compositions provided herein are at least or about at least 10%, 20%, 30%, 40%, 45%, 50%, 55%, 60%, but less than 70% alkoxylated. Suitable rosins that can be modified by alkoxylation and used in the ink compositions provided herein include gum rosin, wood rosin and tall oil rosin. Highly alkoxylated modified rosin compounds are also typically used in the printing industry as a component of fountain solutions, but have not been used as additives to web-offset lithographic inks.

Suitable alkoxylated modified rosins that can be incorporated in the compositions provided herein include alkoxylated modified rosins such as methoxy modified (i.e., methoxylated) rosins, ethoxy modified (i.e., ethoxylated) rosins, propoxy modified (i.e., propoxylated) rosins, butoxy modified (i.e., butoxylated) rosins, and any other alkoxy modified rosin that will be known to those of skill in the art. Such modified rosins are known in the art and can be purchased from suppliers such as Ethox Chemicals (Greenville, S.C.), Eastman Chemical Company (Kingsport, Tenn.), Lawter (Chicago, Ill.) and MWV (Richmond, Va.).

A particular example of an alkoxylated modified rosin used in exemplary embodiments of the invention is Ethox 4614 (Ethox Chemicals, Greenville, S.C.). Ethox 4614 is a water-soluble highly ethoxylated modified rosin that is at least 50% ethoxylated.

In the compositions provided herein, the total amount of alkoxylated modified rosin as a percentage (%>) by weight of the composition (wt %>) can be, e.g., from at or about 0.1% to at or about 10%, such as 0.1% to 0.5%, 0.1% to 0.75%, 0.1% to 1%, 0.1% to 1.5%, 0.1% to 2%, 0.1% to 2.5%, 0.1% to 3%, 0.1% to 3.5%, 0.1% to 4%, 0.1% to 4.5%, 0.1% to 5%, 0.1% to 5.5%, 0.1% to 6%, 0.1% to 6.5%, 0.1% to 7%, 0.1% to 7.5%, 0.1% to 8%, 0.1% to 8.5%, 0.1% to 9%, 0.1% to 9.5%, 0.1% to 10%, 0.5% to 0.75%, 0.5% to 1%, 0.5% to 1.5%, 0.5% to 2%, 0.5% to 2.5%, 0.5% to 3%, 0.5% to 3.5%, 0.5% to 4%, 0.5% to 4.5%, 0.5% to 5%, 0.5% to 5.5%, 0.5% to 6%, 0.5% to 6.5%, 0.5% to 7%, 0.5% to 7.5%, 0.5% to 8%, 0.5% to 8.5%, 0.5% to 9%, 0.5% to 9.5%, 0.5% to 10%, 0.75% to 1%, 0.75% to 1.5%, 0.75% to 2%, 0.75% to 2.5%, 0.75% to 3%, 0.75% to 3.5%, 0.75% to 4%, 0.75% to 4.5%, 0.75% to 5%, 0.75% to 5.5%, 0.75% to 6%, 0.75% to 6.5%, 0.75% to 7%, 0.75% to 7.5%, 0.75% to 8%, 0.75% to 8.5%, 0.75% to 9%, 0.75% to 9.5%, 0.75% to 10%, 1% to 1.5%, 1% to 2%, 1% to 2.5%, 1% to 3%, 1% to 3.5%, 1% to 4%, 1% to 4.5%, 1% to 5%, 1% to 5.5%, 1% to 6%, 1% to 6.5%, 1% to 7%, 1% to 7.5%, 1% to 8%, 1% to 8.5%, 1% to 9%, 1% to 9.5%, 1% to 10%, 1.5% to 2%, 1.5% to 2.5%, 1.5% to 3%, 1.5% to 3.5%, 1.5% to 4%, 1.5% to 4.5%, 1.5% to 5%, 1.5% to 5.5%, 1.5% to 6%, 1.5% to 6.5%, 1.5% to 7%, 1.5% to 7.5%, 1.5% to 8%, 1.5% to 8.5%, 1.5% to 9%, 1.5% to 9.5%, 1.5% to 10%, 2% to 2.5%, 2% to 3%, 2% to 3.5%, 2% to 4%, 2% to 4.5%, 2% to 5%, 2% to 5.5%, 2% to 6%, 2% to 6.5%, 2% to 7%, 2% to 7.5%, 2% to 8%, 2% to 8.5%, 2% to 9%, 2% to 9.5%, 2% to 10%, 2.5% to 3%, 2.5% to 3.5%, 2.5% to 4%, 2.5% to 4.5%, 2.5% to 5%, 2.5% to 5.5%, 2.5% to 6%, 2.5% to 6.5%, 2.5% to 7%, 2.5% to 7.5%, 2.5% to 8%, 2.5% to 8.5%, 2.5% to 9%, 2.5% to 9.5%, 2.5% to 10%, 3% to 3.5%, 3% to 4%, 3% to 4.5%, 3% to 5%, 3% to 5.5%, 3% to 6%, 3% to 6.5%, 3% to 7%, 3% to 7.5%, 3% to 8%, 3% to 8.5%, 3% to 9%, 3% to 9.5%, 3% to 10%, 3.5% to 4%, 3.5% to 4.5%, 3.5% to 5%, 3.5% to 5.5%, 3.5% to 6%, 3.5% to 6.5%, 3.5% to 7%, 3.5% to 7.5%, 3.5% to 8%, 3.5% to 8.5%, 3.5% to 9%, 3.5% to 9.5%, 3.5% to 10%, 4% to 4.5%, 4% to 5%, 4% to 5.5%, 4% to 6%, 4% to 6.5%, 4% to 7%, 4% to 7.5%, 4% to 8%, 4% to 8.5%, 4% to 9%, 4% to 9.5%, 4% to 10%, 4.5% to 5%, 4.5% to 5.5%, 4.5% to 6%, 4.5% to 6.5%, 4.5% to 7%, 4.5% to 7.5%, 4.5% to 8%, 4.5% to 8.5%, 4.5% to 9%, 4.5% to 9.5%, 4.5% to 10%, 5% to 5.5%, 5% to 6%, 5% to 6.5%, 5% to 7%, 5% to 7.5%, 5% to 8%, 5% to 8.5%, 5% to 9%, 5% to 9.5%, 5% to 10%, 5.5% to 6%, 5.5% to 6.5%, 5.5% to 7%, 5.5% to 7.5%, 5.5% to 8%, 5.5% to 8.5%, 5.5% to 9%, 5.5% to 9.5%, 5.5% to 10%, 6% to 6.5%, 6% to 7%, 6% to 7.5%, 6% to 8%, 6% to 8.5%, 6% to 9%, 6% to 9.5%, 6% to 10%, 6.5% to 7%, 6.5% to 7.5%, 6.5% to 8%, 6.5% to 8.5%, 6.5% to 9%, 6.5% to 9.5%, 6.5% to 10%, 7% to 7.5%, 7% to 8%, 7% to 8.5%, 7% to 9%, 7% to 9.5%, 7% to 10%, 7.5% to 8%, 7.5% to 8.5%, 7.5% to 9%, 7.5% to 9.5%, 7.5% to 10%, 8% to 8.5%, 8% to 9%, 8% to 9.5%, 8% to 10%, 8.5% to 9%, 8.5% to 9.5%, 8.5% to 10%, 9% to 9.5%, 9% to 10%, or 9.5% to 10%, by weight of the composition. Generally, the compositions contain less than 10 wt % alkoxylated modified rosin. For example, the compositions provided herein can contain up to at or about 1%, 2%, 3%, 4%, 5%, 6%, 7%, 8%, 9%, or 10% alkoxylated modified rosin, based on the weight of the ink composition.

Provided herein are exemplary web-offset lithographic ink compositions that contain an alkoxylated modified rosin. The web-offset lithographic ink compositions provided herein can be used to reduce or eliminate ink feedback and build-up that commonly occurs during the lithographic printing process. Exemplary of such ink compositions contain an oil-based ink and from at or about 0.1% to at or about 10% of an alkoxylated modified rosin. For example, the ink compositions can contain an oil-based ink and at or about 3% of an alkoxylated modified rosin. In another example, the ink compositions can contain an oil-based ink and at or about 4% of an alkoxylated modified rosin. Another exemplary embodiment contains a radiation-curable ink and from at or about 0.1% to at or about 10% of an alkoxylated modified rosin. For example, the ink compositions can contain a radiation-curable ink, such as an electron-beam cured ink, and at or about 3% of an alkoxylated modified rosin.

3. Offset Lithographic Ink

Provided herein are web-offset lithographic ink compositions containing a water-soluble alkyl thioester surfactant, an alkoxylated modified rosin, or a combination thereof. The web-offset lithographic inks used in the compositions provided herein can be oil-based inks or water-based inks. In some embodiments, the web-offset lithographic inks can be radiation-curable inks, such as electron-beam cured or ultra-violet cured inks. The web-offset lithographic inks used in the compositions provided herein can contain a large number of components, including, but not limited to those listed below in Table 1. As shown in Table 1, an oil-based ink composition can include, for example, one or more ingredients selected from among varnishes, vehicles (gel, insert or G80), clays, pigment bases, emulsion stabilizers, waxes, water, gel linseed, linseed oil, castor oil, soy oil, lubricants, emulsifiers and oils. Typically, such as in the exemplary ink compositions provided herein, when increasing or decreasing the amount of water-soluble alkyl thioether surfactant or alkoxylated modified rosin in the ink composition, the amount of varnish, such as the gel vehicle, can be decreased or increased, respectively.

TABLE 1

Materials useful in formulating typical oil-based ink compositions

| Material | Description |
| --- | --- |
| Phenolic free flow varnish 1 | 45% phenolic modified rosin ester, ink oil (Sun Chemical; Hopkinsville, KY) |
| Phenolic free flow varnish 2 | 47% phenolic modified rosin ester, ink oil (Sun Chemical; Hopkinsville, KY) |
| Gel vehicle (varnish) | 49% phenolic modified rosin ester, 9% soy, ink oil, gellant (Sun Chemical; Hopkinsville, KY) |
| Insert vehicle | 50% phenolic modified rosin ester, 9% soy, ink oil, gellant (Sun Chemical; Hopkinsville, KY) |
| G80 vehicle | 22% soy, 10% 140 melt hydrocarbon, 43% phenolic modified rosin ester, ink oil, gallant (Sun Chemical; Hopkinsville, KY) |
| Clay compound | 50% kaolin clay compound |
| Black pigment | Black base, uncoated flat carbon black, HC varnish, ink oil, alkyd (Sun Chemical; Frankfort, IN) |
| Cyan pigment | Phthalo cyan flush (Sun Chemical; Muskegon, MI) |
| Rubine pigment | Lithol rubine flush (Sun Chemical; Muskegon, MI) |
| Rubine pigment | Lithol rubine flush (Apollo Colors; Rockdale, IL) |
| Yellow pigment | AAA Yellow 12 flush (Sun Chemical; Muskegon, MI) |
| Orange pigment | Orange base for toning ink (Apollo Colors, Rockdale, IL) |
| Bentone compound | Organoclay rheological additive |
| Optilith 3 | Emulsion stabilizer (Hexion; Columbus, OH) |
| Microcrystalline wax compound | Hydrocarbon wax produced from petroleum |
| Wax compound | PTFE (Teflon) wax compound |
| Water | Water |
| Gelled linseed oil | Gelled linseed oil |
| Soybean oil | Soybean oil |
| Linseed oil | Linseed oil |
| Water fighter | Polymerized castor oil |
| OSO ™ lubricant | Gelled petroleum oil (Agip; Cabot, PA) |
| Emulsifier | Dimer acid |
| TRO (Turkey Red Oil) | Sulfonated castor oil |
| N100 ink oil | Paraffinic oil |
| Magie 500 Oil | Petroleum oil (Calumet M500, Calumet; Indianapolis, IN) |
| Magie 470 Oil | Petroleum oil (Calumet M470, Calumet; Indianapolis, IN) |

The web-offset lithographic ink compositions provided herein contain a water-soluble alkyl thioether surfactant or an alkoxylated modified rosin, such as a highly ethoxylated modified rosin, or a combination thereof. The ink compositions provided herein can be oil-based inks or water-based inks. The inks can be radiation-curable inks, such as electron-beam cured or ultra-violet cured. Use of these ink compositions in printing, for example in web-offset lithographic printing, improves printing and reduces or eliminates ink feedback and ink build-up, key problems in lithography. The ink compositions can be used in a wide variety of printing applications, such as in heat-set offset ink printing, sheet fed printing, newspaper printing, and energy-curable offset ink printing.

C. Examples

Example 1

Examples of representative web-offset lithographic oil-based ink compositions in various colors that include one or more of the components identified in Table 1 are Inks 1-4, described in Table 2 below. The oil-based ink compositions shown in Table 2 are only examples of typical oil-based inks that do not contain a water-soluble alkyl thioether surfactant or alkoxylated modified rosin and should not be viewed as limiting.

TABLE 2

Composition (in wt. %) of comparative oil-based inks not containing a water-soluble thioether surfactant or alkoxylated modified rosin

| Description (see Table 1 for specific details) | Ink 1 (black) | Ink 2 (Cyan) | Ink 3 (rubine) | Ink 4 (yellow) |
|---|---|---|---|---|
| Phenolic free flow varnish 1 | 0.0 | 0.0 | 0.0 | 7.0 |
| Phenolic free flow varnish 2 | 0.0 | 0.0 | 6.3 | 0.0 |
| Gel vehicle (varnish) | 0.0 | 21.5 | 19.8 | 27.0 |
| Insert vehicle | 0.0 | 0.0 | 0.0 | 0.0 |
| G80 vehicle | 0.0 | 10.0 | 7.6 | 4.5 |
| Clay compound | 0.0 | 10.0 | 10.0 | 8.5 |
| Black pigment | 83.0 | 0.0 | 0.0 | 0.0 |
| Cyan pigment | 0.0 | 39.0 | 0.0 | 0.0 |
| Rubine pigment (Sun Chemical) | 0.0 | 0.0 | 40.0 | 0.0 |
| Rubine pigment (Apollo Colors) | 0.0 | 0.0 | 0.0 | 0.0 |
| Yellow pigment | 0.0 | 0.0 | 0.0 | 28.0 |
| Orange pigment | 0.0 | 0.0 | 0.0 | 0.3 |
| Bentone compound | 1.0 | 1.5 | 1.5 | 2.0 |
| Emulsion stabilizer | 0.3 | 0.0 | 0.0 | 0.0 |
| Microcrystalline wax compound | 0.0 | 5.0 | 5.0 | 5.0 |
| Wax compound | 0.3 | 0.0 | 0.0 | 0.0 |
| Water | 0.0 | 0.0 | 0.0 | 3.0 |
| Gelled linseed oil | 0.0 | 0.0 | 1.0 | 0.0 |
| Soybean oil | 4.0 | 0.0 | 0.0 | 0.0 |
| Linseed oil | 0.0 | 0.0 | 0.0 | 0.0 |
| Water fighter | 1.5 | 1.0 | 0.0 | 1.5 |
| OSO ™ lubricant | 0.0 | 3.0 | 0.0 | 3.0 |
| Emulsifier | 1.0 | 0.0 | 0.0 | 0.2 |
| Alkyl thioether surfactant/ alkoxylated modified rosin | 0.0 | 0.0 | 0.0 | 0.0 |
| TRO (sulfonated castor oil) | 0.0 | 0.3 | 0.4 | 0.0 |
| N100 ink oil | 3.0 | 0.0 | 0.0 | 0.0 |
| Petroleum ink oil | 5.8 | 8.7 | 8.5 | 10.0 |
| Total (wt. %) | 100 | 100 | 100 | 100 |

The following Table 3 provides exemplary web-offset lithographic oil-based ink compositions that contain 0.3% of a water-soluble alkyl thioether surfactant, EnviroGem® 360 (Air Products, Allentown, Pa.). These compositions are simply exemplary and should not be viewed as limiting.

TABLE 3

Composition (in wt. %) of oil-based inks containing water-soluble alkyl thioether surfactant

| Description (see Table 1 for specific details) | Ink 5 (black) | Ink 6 (Cyan) | Ink 7 (rubine) | Ink 8 (yellow) |
|---|---|---|---|---|
| Phenolic free flow varnish 1 | 0.0 | 0.0 | 0.0 | 0.0 |
| Phenolic free flow varnish 2 | 0.0 | 0.0 | 0.0 | 0.0 |
| Gel vehicle (varnish) | 0.0 | 26.0 | 26.7 | 33.0 |
| Insert vehicle | 0.0 | 0.0 | 0.0 | 0.0 |
| G80 vehicle | 0.0 | 0.0 | 0.0 | 0.0 |
| Clay compound | 0.0 | 9.0 | 9.0 | 9.0 |
| Black pigment | 79.0 | 0.0 | 0.0 | 0.0 |
| Cyan pigment | 0.0 | 39.0 | 0.0 | 0.0 |
| Rubine pigment (Sun Chemical) | 0.0 | 0.0 | 0.0 | 0.0 |
| Rubine pigment (Apollo Colors) | 0.0 | 0.0 | 40.0 | 0.0 |
| Yellow pigment | 0.0 | 0.0 | 0.0 | 28.0 |
| Orange pigment | 0.0 | 0.0 | 0.0 | 0.3 |
| Bentone compound | 0.0 | 0.0 | 0.0 | 0.0 |
| Emulsion stabilizer | 0.3 | 0.0 | 0.0 | 0.0 |
| Microcrystalline wax compound | 0.0 | 0.0 | 0.0 | 0.0 |
| Wax compound | 0.5 | 0.7 | 0.7 | 0.7 |
| Water | 7.0 | 11.0 | 8.0 | 11.0 |
| Gelled linseed oil | 0.0 | 0.0 | 0.0 | 0.0 |
| Soybean oil | 3.0 | 0.0 | 0.0 | 0.0 |
| Linseed oil | 0.0 | 4.0 | 4.0 | 4.0 |
| Water fighter | 1.5 | 0.0 | 0.0 | 0.0 |
| OSO ™ lubricant | 0.0 | 3.0 | 3.0 | 3.0 |
| Emulsifier | 0.5 | 0.5 | 0.0 | 0.5 |
| Alkyl thioether surfactant (EnviroGem 360) | 0.3 | 0.3 | 0.3 | 0.3 |
| TRO (sulfonated castor oil) | 0.0 | 0.0 | 0.3 | 0.0 |
| N100 ink oil | 3.0 | 0.0 | 0.0 | 0.0 |
| Petroleum ink oil | 5.0 | 6.6 | 8.1 | 10.3 |
| Total (wt. %) | 100 | 100 | 100 | 100 |

A comparison of the tack, Laray viscosity (L viscosity) and yield (L yield) between comparative oil-based inks from Table 2 (Inks 1-4) and exemplified oil-based inks containing a water-soluble alky thioether surfactant (Inks 5-8) from Table 3 is provided in Tables 5 and 6 below.

The importance of tack is that it is not so excessive that it doesn't allow effective transfer of ink from the rollers to the plate and then to the blanket and on to the substrate being printed. Inks can also be tack "graded" in descending sequence to allow for better trapping of one color over another. Inks with too much tack can cause the surface of the paper to pick off and interfere with transfer onto subsequent printing units and copies.

Tack can be measured using an inkometer as generally available on the market. The inkometer is able to provide reliable data on ink tack by simulating the dynamic conditions that occur in the printing process. In testing tack, the inkometer actually measures the integrated forces involved in ink film splitting and the effects of speed, film thickness, temperature and solvent evaporation on these forces.

The test results are given in numerical values (in gram-meters) representing the torque required to "work" the ink film at known rates, with predetermined film thickness and temperature. These torque readings are actually measurements of the tack of the ink.

The electronic inkometer simplifies ink testing with push-button operation and a digital display of temperature, tack, RPM and test time. For purposes of the above testing, a Thwing-Albert Inkometer (West Berlin, N.J.) was used.

The viscosity and yield values were measured with a Laray viscometer. The Laray viscometer determines the viscosity of a wide range of liquids and viscous materials by measuring the time required for a rod to travel a specified distance. For example, the viscosity of a liquid can be measured using a Laray viscometer, a Laray Timer TMI 92-15 (0.00 second resolution), a temperature probe capable of measuring in 0.5° C. increments, a Laray computer program, a water bath maintained at 25±1° C., approximately 2 to 3.5 grams of sample fluid or liquid and a spatula. Initially, the instruments should be checked for cleanliness and overall proper condition. The Laray viscometer should be leveled. The temperature should also be checked and the instrument should be controlled at 25±1° C. A draft-controlled cabinet can be used to maintain the temperature of 25±1° C. The Laray rod can be wetted using the spatula without overworking the sample. The liquid sample is preferably deposited uniformly around the Laray rod. Consistency in this initial step for testing different samples is likely to result in more consistent data. The Laray rod can then be dropped into the fluid sample using force sufficient to equal a drop time of approximately one second.

A standard Laray test can be accomplished using the drop sequences listed in Table 4 below.

TABLE 4

Laray test drop sequences

| | |
|---|---|
| $1^{st}$ Drop | 1.00-1.15 seconds |
| $2^{nd}$ Drop | 1.85-2.15 seconds |
| $3^{rd}$ Drop | 2.85-3.15 seconds |
| $4^{th}$ Drop | 3.85-4.10 seconds |
| $5^{th}$ Drop | 4.80-5.00 seconds |

It should be understood that a weight capable of dropping the rod within the specified time range can be selected and adjusted as appropriate for each drop sequence listed in Table 4. It is generally preferable to avoid or minimize multiple drops for each time range. The weight, in kilograms, and the time, in seconds, should be recorded along with the collar temperature in degrees Centigrade. The recorded test data can then be uploaded to the Laray program that can calculate the viscosity, yield value, and shortness ratio.

The results can be recorded from these calculations. For the purposes of these measurements, the viscosity at 2500 sec"1 shear rate is defined as the ability of the sample fluid to resist deformation or flow, and is measured in poise (1 poise=0.1 Pascal second). The yield value at 2.5 sec" shear rate is the hypothetical force required to initiate flow and is measured in dynes/cm. Finally, the shortness ratio is the ratio of yield value to viscosity.

An alternative to the standard Laray test is the Vertis Laray method. The Vertis Laray method involves preparing a sample and placing the sample on the Laray rod as described above. A 700 g weight is then placed on the rod before it is dropped. The rod is then pulled back so that the sample can be redistributed around the collar and the rod. The rod is then dropped two consecutive times with the 700 g weight while recording the time. The drop-times are preferably within ±0.1 seconds of each other. The average of the drop times is set as the initial time. The rod can then be dropped three more times: once with a 500 g weight, once with a 300 g weight, and once with a 100 g weight. The time should be recorded for each drop. The collar temperature should also be recorded in degree Centigrade. The recorded data is then uploaded into the Laray program which can then calculate the viscosity, yield value, and shortness ratio as defined above.

For purposes of comparing the properties of the comparative oil-based inks not containing a water-soluble alkyl thioether surfactant listed in Table 2 (Inks 1-4) to the oil-based inks containing a water-soluble alkyl thioether surfactant listed in Table 3 (Inks 5-8), 1 minute and 5 minute tack tests were conducted. As shown in Tables 5 and 6, the addition of a water-soluble alkyl thioether surfactant to the oil-based inks does not affect desirable ink properties such as tack, viscosity and yield, but does, as discussed below, alleviate the ink feedback problem.

TABLE 5

Properties of comparative oil-based inks not containing a water-soluble alkyl thioether surfactant

| | Ink 1 (black) | Ink 2 (Cyan) | Ink 3 (rubine) | Ink 4 (yellow) |
|---|---|---|---|---|
| 1' Tack Test (g · m) | 5.0 | 5.4 | 5.2 | 5.2 |
| 5' Tack Test (g · m) | 6.3 | 7.5 | 7.8 | 7.4 |
| Laray Viscosity | 102 | 52 | 59 | 80 |
| Laray Yield | 1443 | 1440 | 1760 | 1606 |

TABLE 6

Properties of oil-based inks containing a water-soluble alkyl thioether surfactant

| | Ink 1 (black) | Ink 2 (Cyan) | Ink 3 (rubine) | Ink 4 (yellow) |
|---|---|---|---|---|
| 1' Tack Test (g · m) | 5.0 | 5.0 | 5.2 | 5.6 |
| 5' Tack Test (g · m) | 6.4 | 6.7 | — | — |
| Laray Viscosity | 73 | 55 | 58 | 69 |
| Laray Yield | 1060 | 1580 | 1710 | 2660 |

The web-offset lithographic oil-based ink compositions were tested to compare the effect the presence of a water-soluble alkyl thioether surfactant had on ink feedback and ink build-up. Testing involved a web offset heat-set press (Didde Corporation, Springboro, Ohio).

Figure 1:
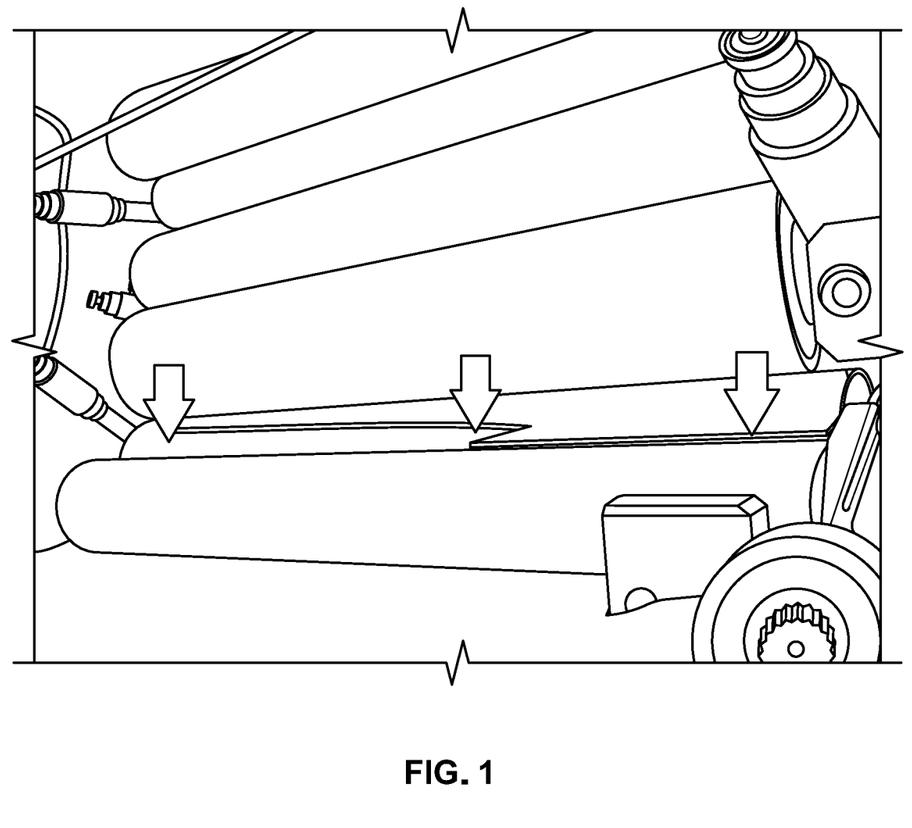
FIG. 1 illustrates the results of a 5 minute press trial run on a Didde press using 2¼ notches, a 20% water setting, and densities of 0.95, 0.96 and 0.99 with oil-based Ink 4 (comparative), a lower tack laser yellow ink that does not contain either an alkyl thioether surfactant or an alkoxylated modified rosin. After 5 minutes, there was significant accumulation of residue ink on the far left edge of the bottom ink roller and several bands of yellow ink that accumulated across the entire bottom ink roller, presenting a significant feedback problem. Ink feedback is indicated by arrows.

A 5 minute trial using oil-based comparative Ink 4 (see Table 2), a lower tack laser yellow ink that did not contain any alkyl thioether surfactants, was run on a Didde press using 2¼ notches, a 20% water setting, and densities of 0.95, 0.96 and 0.99. After 5 minutes, residue ink accumulated on the ink roller and thus presented a significant feedback problem. There was particularly high accumulation of yellow ink on the far left edge of the bottom ink roller, as well as several bands of yellow ink that accumulated across the entire bottom ink roller. The results are illustrated in FIG. 1, with arrows indicating ink feedback.

Figure 2A:
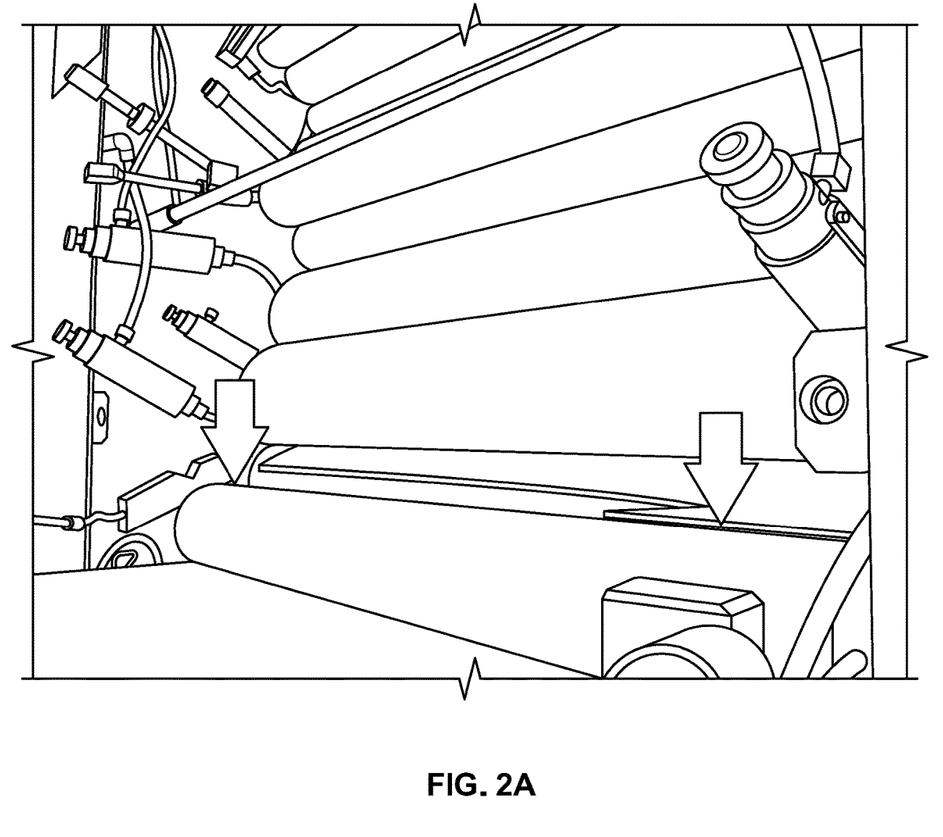
FIG. 2A illustrates the results of a press trial run on a Didde press at a press speed of 100 fpm on 30# abibo paper with a 5% image using oil-based Ink 4 (comparative), a lower tack laser yellow ink that did not contain either an alkyl thioether surfactant or an alkoxylated modified rosin. After the run was complete, there was accumulation of ink feedback on the bottom ink roller.
Figure 2B:
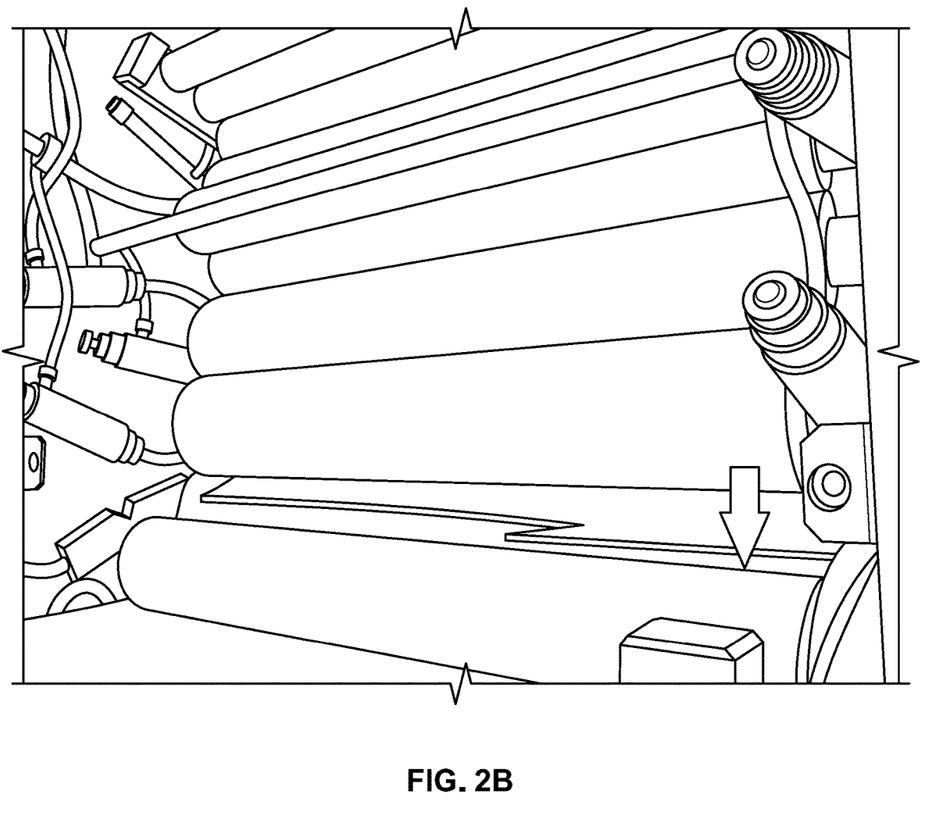
FIG. 2B shows the results of yellow Ink 9 (containing 0.3% of a water-soluble alkyl thioether surfactant EnviroGem® 360), tested under the same conditions as for FIG. 2A, but resulting in ink accumulation on the bottom ink roller. Ink feedback is indicated by arrows.

A trial using comparative Ink 4 (see Table 2), a yellow ink which did not contain any alkyl thioether surfactant, was run on a Didde press at a press speed of 100 fpm on 30# abibo paper with a 5% image. The fountain solution used was Printeasy 2050 (5 oz/gallon). After the run was complete, there was accumulation of ink feedback on the bottom ink roller. The results are illustrated in FIG. 2A, with arrows indicating areas of ink feedback. Conversely, when about 0.3% of a water-soluble alkyl thioether surfactant Enviro-Gem® 360 was added to the yellow ink (Ink 8; Table 3) and tested under the same conditions as for Ink 4, feedback accumulation on the bottom ink roller was substantially reduced. The bottom ink roller did not have any visible bands of yellow ink. These results are illustrated in FIG. 2B, with arrows indicating areas of ink feedback.

Example 2

Several web-offset lithographic oil-based ink compositions were prepared and are shown below in Table 7. Ink 9 (comparative) is an oil-based Dingley yellow laser ink that did not contain any alkoxylated modified rosin. The exemplified compositions (Inks 10-11) are oil-based ink compositions that contained about 3% or about 4% of a water-soluble highly ethoxylated rosin, Ethox 4614 (Ethox Chemicals, Greenville, S.C.).

TABLE 7

Compositions (in wt. %) of oil-based inks containing water-soluble alkoxylated modified rosin

| Description | Ink 9 (comparative) | Ink 10 (3% rosin) | Ink 11 (4% rosin) |
| --- | --- | --- | --- |
| Phenolic free flow varnish 1 | 7.0 | 7.0 | 7.0 |
| Phenolic free flow varnish 2 | 0.0 | 0.0 | 0.0 |
| Gel vehicle (varnish) | 27.0 | 24.0 | 23.0 |
| Insert vehicle | 0.0 | 0.0 | 0.0 |
| G80 vehicle | 4.5 | 4.5 | 4.5 |
| Clay compound | 8.5 | 8.5 | 8.5 |
| Black pigment | 0.0 | 0.0 | 0.0 |
| Cyan pigment | 0.0 | 0.0 | 0.0 |
| Rubine pigment (Sun Chemical) | 0.0 | 0.0 | 0.0 |
| Rubine pigment (Apollo Colors) | 0.0 | 0.0 | 0.0 |
| Yellow pigment | 28.0 | 28.0 | 28.0 |
| Orange pigment | 0.3 | 0.3 | 0.3 |
| Bentone compound | 2.0 | 2.0 | 2.0 |
| Emulsion stabilizer | 0.0 | 0.0 | 0.0 |
| Microcrystalline wax compound | 5.0 | 5.0 | 5.0 |
| Wax compound | 0.0 | 0.0 | 0.0 |
| Water | 3.0 | 3.0 | 3.0 |
| Gelled linseed oil | 0.0 | 0.0 | 0.0 |
| Soybean oil | 0.0 | 0.0 | 0.0 |
| Linseed oil | 0.0 | 0.0 | 0.0 |
| Water fighter | 1.5 | 1.5 | 1.5 |
| OSO ™ lubricant | 3.0 | 3.0 | 3.0 |
| Emulsifier | 0.2 | 0.2 | 0.2 |
| Alkoxylated modified rosin (Ethox 4614) | 0.0 | 3.0 | 4.0 |
| TRO (sulfonated castor oil) | 0.0 | 0.0 | 0.0 |
| N100 ink oil | 0.0 | 0.0 | 0.0 |
| Petroleum ink oil | 10.0 | 10.0 | 10.0 |
| Total (wt. %) | 100 | 100 | 100 |

Figure 3A:
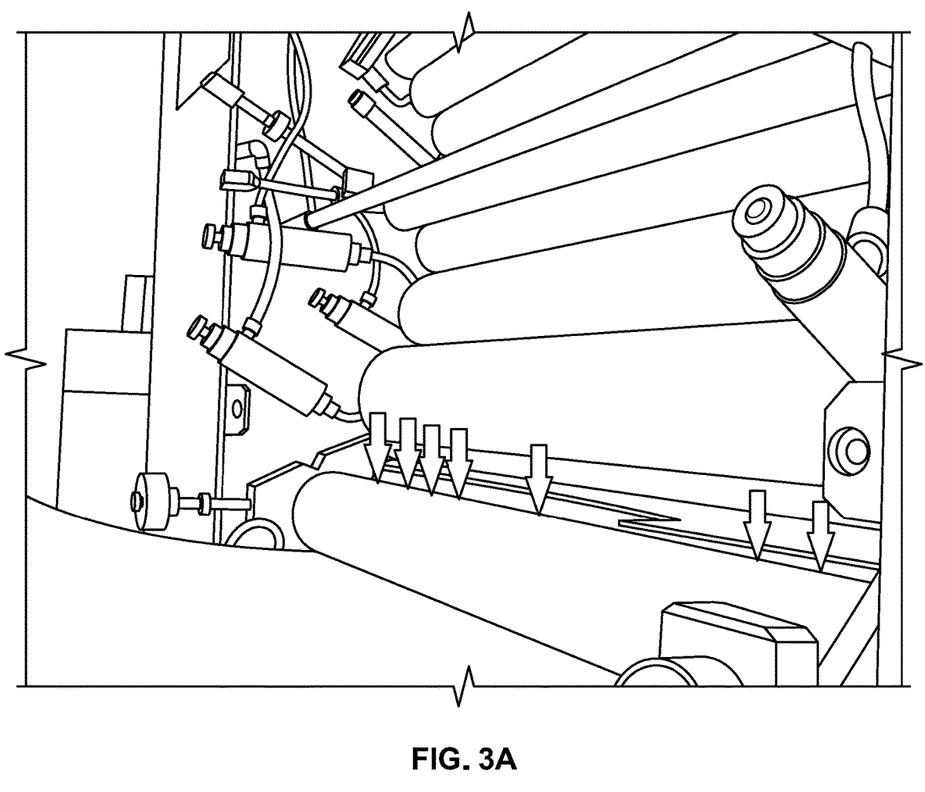
Figure 3B:
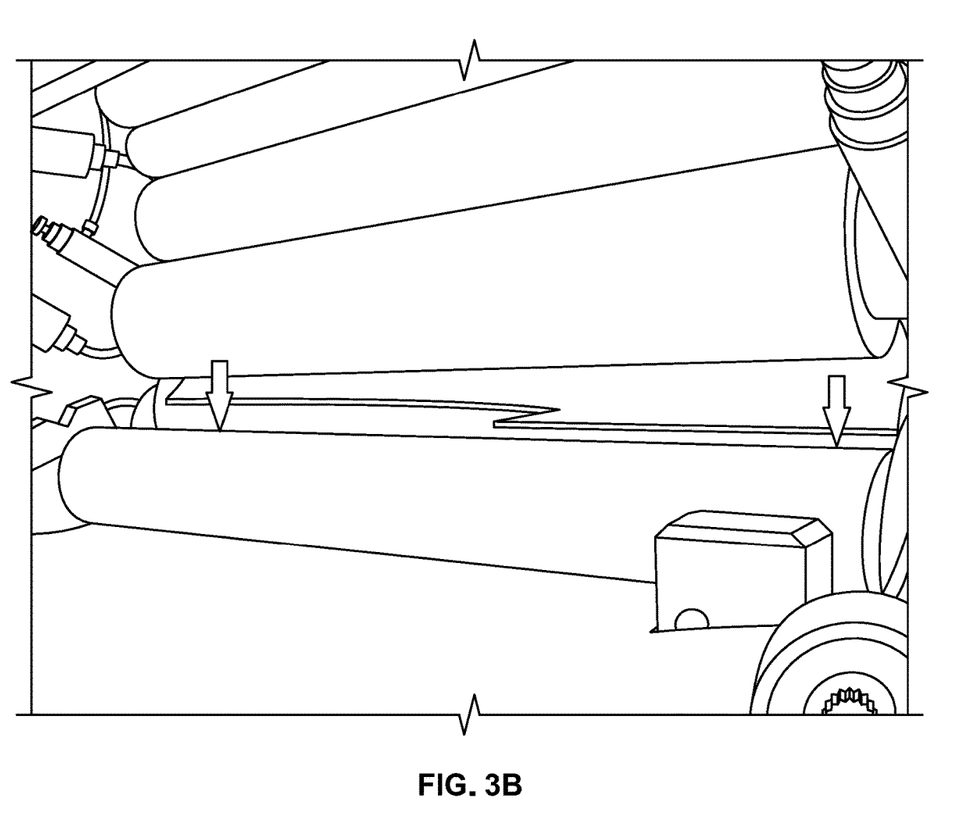
FIG. 3B shows the results of the trial after the addition of 4% of a highly alkoxylated modified rosin to the ink. There was a substantial decrease in ink feedback on the bottom ink roller. Ink feedback is indicated by arrows.

A trial using comparative Ink 9 (Table 7) was run on a Didde press. There was significant accumulation of yellow ink feedback in the form of multiple scattered dark yellow bands on the bottom ink roller after the trial run was complete. The results are illustrated in FIG. 3A, with arrows indicating areas of ink feedback. About 4% highly ethoxylated rosin (Ethox 4614) was then added to the yellow ink (Ink 11; Table 7) and the test was rerun. FIG. 3B shows the results of the test after the addition of 4% rosin to the ink, with arrows indicating areas of ink feedback. The addition of the highly ethoxylated rosin to the ink resulted in a substantial reduction of ink feedback on the bottom roller. Several yellow bands were visible on the bottom ink roller, though they were less numerous and significantly lighter in color compared to the results of the ink without the highly ethoxylated modified rosin (Ink 9).

Example 3

Six electon beam (EB) cured offset lithographic inks containing 3% of a water-soluble highly ethoxylated rosin, Ethox 4614, were prepared, each containing a different pigment color (Ink 13=cyan; Ink 14=magenta; Ink 15=yellow; Ink 16=black; Ink 17=green; Ink 18=brown). A comparative EB cured offset lithographic ink was prepared that did not contain the modified rosin (Ink 12). The ink formulations are set forth in Table 8 below, where the "pigment" of Inks 13-18 is cyan, magenta, yellow, black, green, or brown, respectively.

TABLE 8

Composition (in wt. %) of electron-beam cured offset inks

| Description | Ink 12 (comparative) | Inks 13-18 (3% rosin) |
| --- | --- | --- |
| Aldehyde resin (Laropal ® A81; BASF; Germany | 26.0 | 23.0 |
| Inhibitor | 2.0 | 2.0 |
| Energy-curable polyester acrylate (Ebecryl ® 871; Cytec; Woodland Park, NJ) | 18.0 | 18.0 |
| Polyester acrylate | 10.0 | 10.0 |
| Alkoxylated modified rosin (Ethox 4614) | 0 | 3.0 |
| Low viscosity epoxy acrylate | 16.0 | 16.0 |
| Hyperdispersant | 0.5 | 0.5 |
| Pigment | 14.5 | 14.5 |
| Talc | 5.0 | 5.0 |
| PE wax | 1.0 | 1.0 |
| PTFE wax | 1.0 | 1.0 |
| Propoxylated neopentyl glycol diacrylate monomer (2PO NPGDA) | 6.0 | 6.0 |
| Total (wt. %) | 100 | 100 |

Print trials using comparative Ink 12 and exemplary Inks 13-18 (Table 8) were run on a Drent Goebel VSOP press (Eerbeek, Netherlands) and a Goss VSOP press (Durham, N.H.) using a coated board substrate and Rycoline® Print-Easy™ 4600 fountain solution (Sun Chemical, Chicago, Ill.). In all print trials that used the comparative Ink 12, there was severe accumulation of ink feedback on the bottom ink roller after the run was complete. Print trials that used exemplary Inks 13-18 that contained 3% Ethox 4614 completely eliminated the ink feedback. The addition of the highly ethoxylated modified rosin to Inks 13-18 resulted in a substantial reduction of ink feedback on the bottom roller.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed:

1. A radiation-curable web-offset lithographic ink composition, comprising:
   a colorant;
   a varnish; and
   a water-soluble alkoxylated modified rosin, wherein the modified rosin is 10% to 70% alkoxylated;

wherein the modified rosin is present in an amount of from at or about 0.1% to at or about 10% by weight of the ink composition;

wherein the ink is a lithographic ink; and wherein the ink is energy-curable; and wherein the ink is suitable for use in a lithographic system wherein the printing plate is continuously treated with an aqueous fountain solution.

2. The composition of claim 1, wherein the modified rosin is selected from among a methoxylated modified rosin, ethoxylated modified rosin, propoxylated modified rosin and butoxylated modified rosin.

3. The composition of claim 1, wherein the modified rosin is at least 50% alkoxylated.

4. The composition of claim 1, wherein the modified rosin is an ethoxylated modified rosin.

5. The composition of claim 1, further comprising an ingredient selected from among a vehicle, a clay, an emulsion stabilizer, a wax, an oil and an emulsifier, or any combination thereof.

\* \* \* \* \*